United States Patent [19]

Fort

[11] Patent Number: 5,093,598
[45] Date of Patent: Mar. 3, 1992

[54] SEMICONDUCTOR INSULATION LAYER FOR STATOR COIL CONNECTIONS

[75] Inventor: Emil M. Fort, Maitland, Fla.

[73] Assignee: Westinghouse Electric Corp., Pittsburgh, Pa.

[21] Appl. No.: 386,066

[22] Filed: Jul. 28, 1989

[51] Int. Cl.$^5$ .............................................. H02K 3/34
[52] U.S. Cl. ..................................... 310/215; 310/45; 310/260
[58] Field of Search ................ 310/45, 215, 260, 71, 310/196, 208, 214; 174/138 F, 105 SC, 106 SC

[56] References Cited

U.S. PATENT DOCUMENTS

| | | | |
|---|---|---|---|
| 3,980,910 | 9/1976 | Steinebronn et al. | 310/71 |
| 4,001,616 | 1/1977 | Lonseth et al. | 310/45 |
| 4,008,409 | 2/1977 | Rhudy et al. | 310/45 |
| 4,385,254 | 5/1983 | Vakser et al. | 310/260 |
| 4,420,701 | 12/1983 | Nikitin et al. | 310/71 |
| 4,425,519 | 1/1984 | Balke et al. | 310/45 |
| 4,473,765 | 9/1984 | Butman, Jr. et al. | 310/215 |
| 4,533,580 | 8/1985 | Otty | 428/36 |
| 4,543,507 | 9/1985 | Heyraud | 310/266 |
| 4,724,345 | 2/1988 | Elton et al. | 310/45 |

Primary Examiner—Steven L. Stephan
Assistant Examiner—E. To
Attorney, Agent, or Firm—A. Addessi

[57] ABSTRACT

Methods and apparatus that improve flashover voltage levels in turbine-generators, and reduce the spacing between the end portion connections of one phase group and the end portion connections of neighboring phase groups provide a semiconducting layer on the inside surfaces of insulation that surrounds such stator coil connections. At least one of the metallic connectors which join the end portions in each phase group is electrically coupled to this semiconducting layer, such that discharge between the metallic connector and the insulation surrounding its associated phase group are prevented.

9 Claims, 2 Drawing Sheets

SEMICONDUCTOR INSULATION LAYER FOR STATOR COIL CONNECTIONS

BACKGROUND OF THE INVENTION

1. Field of the Invention

The present invention is related generally to stator coil connections in large turbine-generators, and more particularly to methods and apparatus that improve flashover voltage levels in such turbine-generators by providing a semiconducting layer on the inside surfaces of insulation that surrounds the stator coil connections.

2. Statement of the Prior Art

Dynamoelectric machines (e.g., large turbine-generators) typically comprise a stator with a core, a plurality of coil-receiving slots in the core, and a stator winding wound about the core. The stator core in typical dynamoelectric machines is made up of a plurality of laminations, and stator windings including a plurality of hard-sided coils are frequently used in such stator cores. Because of the irregularities that may be formed between the coils and the coil-receiving slots, the use of semiconducting materials to fill voids that are caused by such irregularities has become a fairly common practice in the prior art for inhibiting corona.

For example, U.S. Pat. No. 4,001,616 (Lonseth et al.) desirably inhibits corona in dynamoelectric machines through the provision of conductive paths from the outer surfaces of each conductor insulating jacket to the magnetic core of the dynamoelectric machine. The coil sides in such machines each consist of a plurality of conductor strands that are insulated one from the other, and that are totally enclosed in a jacket consisting of a number of superposed layers of insulation with an outer armor jacket. As is conventional, the insulating layers are resin bonded micaceous tapes while the outer armor jacket consists of one or more layers of semiconducting tape or paint (i.e., a material having a controlled resistance). When fully cured, the resin bonded micaceous tapes become very hard and unyielding. Moreover, Lonseth et al. teach that even with the most careful application of the tapes and curing of the resins with the coil sides in pressure molds, there is some variation in the width of the coil sides and flatness of their radial surfaces occurs causing voids which can lead to corona. In order to avoid such possibility of corona, Lonseth et al. coat the radial surfaces of each coil side with a thin layer of semiconducting material that will adhere to the outer armor jacket of the coil sides, but which will deform when the coil side is pressed into its slot.

A somewhat similar, but separately insertable conformable side filler is disclosed in U.S. Pat. No. 4,008,409 (Rhudy et al.). Each of the side fillers generally comprise a resin impregnated fiber glass mat having a plurality of ridges formed of a semiconducting, pressure-deformable elastomer on one side thereof. Rhudy et al. suggest that such side fillers not only prevent formation of corona across any voids which might exist between the sides of the coil insulation and the sides of the coil-receiving slots, but also prevent undesirable temperature rises and insulation-destroying vibrations.

Yet another approach which has been used in reducing the incidences of corona in coil slots is disclosed in U.S. Pat. No. 4,473,765 (Butman, Jr. et al.). A grading layer is added between the conventional insulating slot armor elements which line the sides of the coil slots and rotor windings contained therein. Generally consisting of an outer layer of a smooth, hard, tough, flexible material that is capable of withstanding elevated temperatures without charring (e.g., an aramid paper), the grading layer in accordance with Butman, Jr. et al. also includes silicon carbide particles which are bonded in a cured plastic matrix to the insulating slot armor elements and the aramid paper.

The prior art practices noted above provide solutions to the problem of corona which may arise as a result of any voids between the coil sides and the sides of their respective coil-receiving slots in the stator core, but they avoid addressing the problem of corona and its potential for causing flashover in the end turns of such stator windings. Stator windings in conventional turbine-generators typically include a plurality of coil portions which are disposed within the coil-receiving slots, and a plurality of end portions extending axially from the core as extensions of the coil portions.

The end portions of the stator winding are divided along the stator circumference into several alternating groups that belong to different phases of the stator winding. Every such group comprises several end portions belonging to one winding phase. Accordingly, each end portion has connecting means to electrically couple the stator winding into its predetermined phase groups. Conductors within the stator winding are often stranded, except in the smallest ratings, to enable an easier shaping of the coil and to limit eddy current losses that may result from the flux which crosses the coil-receiving slot.

The effect of this flux is to produce a voltage within the strand which results in circulating currents (e.g., the thinner the strand, the lesser the voltage and the resulting eddy currents). Since such strands ordinarily are connected together at the joints between the coils, there will also be eddy currents circulating between the strands because of the difference in flux linked by various strands. This source of loss can often be reduced sufficiently by the use of more and thinner conductors per coil, with a corresponding increase in the number of parallel circuits. Alternatively, some kind of transposition may be used to control the eddy currents between strands.

It is known to be satisfactory to make a transposition by groups of strands rather than by individual strands, which can be accomplished in the end portions of the stator winding by connecting the upper groups of one coil in series with the lower groups of adjacent coils. Such groups of strands must, however, be insulated from its adjacent groups throughout the coils included in the transposition.

Another form of insulation must also be provided between the connecting means for each group of end portions. That is, while a comparatively low potential difference exists between two adjacent end portions which are connected together in one winding phase (where the interturn voltage of the one winding phase is determinative of this potential difference), the full line voltage of the stator winding can be present between the end portion connections of two adjacent phase groups. A taped structure, or a special insulating box (e.g., a dielectric box as is shown in U.S. Pat. No. 4,385,254—Vakser et al.) can be used to provide such insulation.

None of the patents that are discussed above completely avoids the problems of corona or its attendant potential for causing flashover in the end portions of the stator winding. It has been found by the inventor herein that irregularities in the overall surface of the end portion connections in one phase group can affect the uniformity of an electrical field between the end portion connections of adjacent phase groups. That is, a non-uniform electrical field which can lead to an occurrence of flashover results when voids exist between the irregular surface of the end portion connections of a single phase group and the insulating means surrounding those phase group connections. This is especially so in stator windings having transposition group connections. As a result, spaces between the end portion connections of adjacent phase groups must be increased in order to avoid discharge during service and flashover during high-voltage tests.

SUMMARY OF THE INVENTION

Accordingly, it is a general object of this invention to provide an improved turbine-generator. It is a more specific object of the present invention to provide a turbine-generator having improved flashover voltage levels.

It is another object of this invention to provide methods and apparatus to improve flashover voltage levels in turbine-generators while, at the same time, reducing the space between end portion connections of adjacent phase groups.

Still a further object of the present invention is to provide simple, inexpensive methods and apparatus that improve flashover voltage levels in turbine-generators, and reduce the spacing between the end portion connections of one phase group and the end portion connections of neighboring phase groups.

Briefly, these and other objects in accordance with this invention are accomplished by providing a semiconducting layer on the inside surfaces of insulation that surrounds the stator coil connections. At least one of the metallic (e.g., solder) connectors which join the end portions in each phase group is electrically coupled to this semiconducting layer, such that discharges between the metallic connector and the insulation surrounding its associated phase group are prevented.

Other objects, advantages and novel features according to the present invention will become more apparent from the following detailed description thereof, when considered in conjunction with the accompanying drawings wherein:

DETAILED DESCRIPTION OF THE INVENTION

Figure 1:
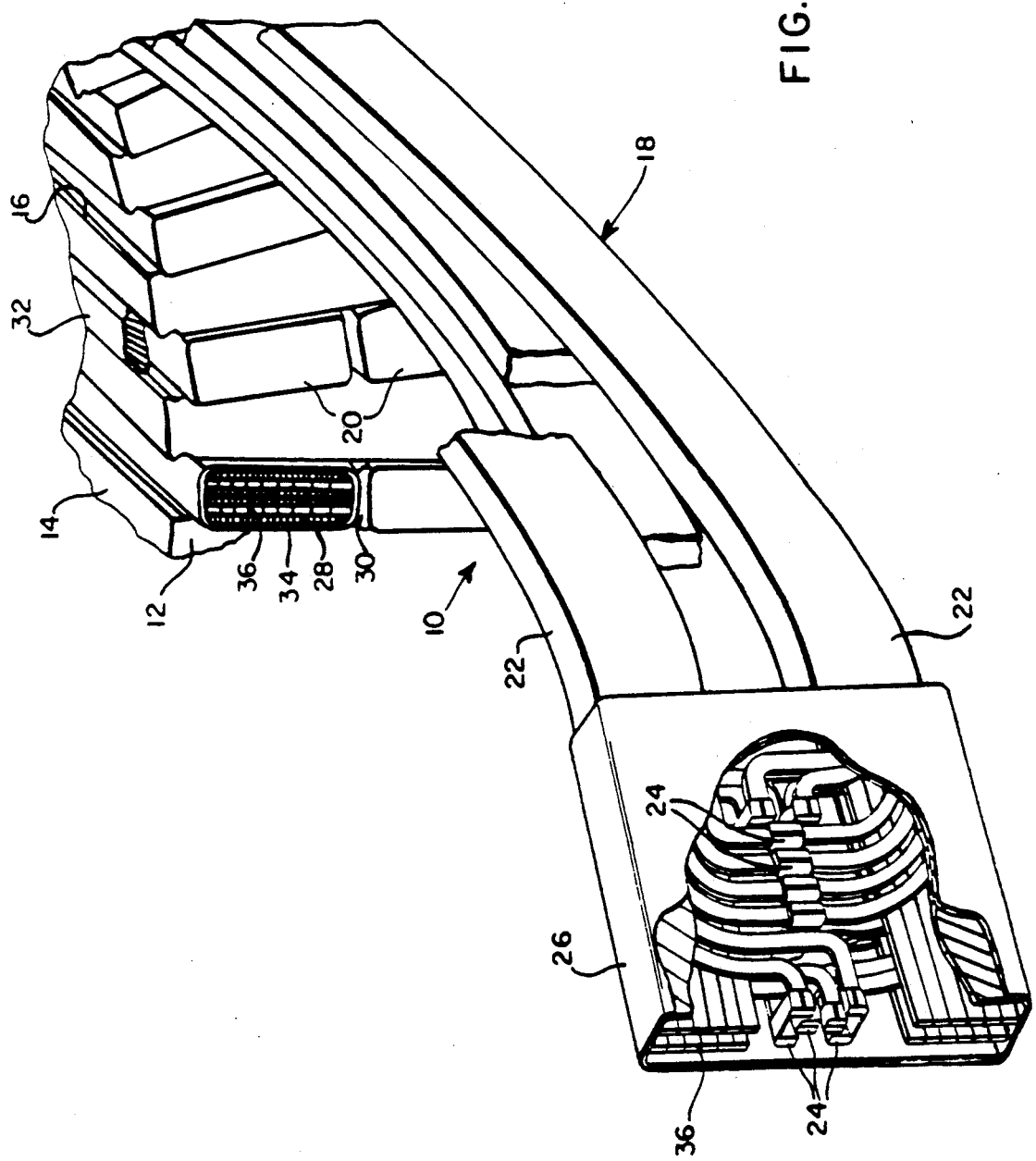
FIG. 1 shows a typical stator winding in a conventional hydrogen inner-cooled turbine-generator.

Referring now to the drawings, wherein similar numbers designate like or corresponding elements throughout both of the figures, there is shown in FIG. 1 (partly in section) a dynamoelectric machine comprising a typical hydrogen inner-cooled turbine-generator 10.

The turbine-generator 10 as shown includes a stator 12 with a core 14, a plurality of coil-receiving slots 16 formed axially in the core 14, and a stator winding 18 that is wound about the core 14. Stator winding 18 includes a plurality of coil portions 20 that are disposed within the slots 16, and a corresponding plurality of end portions 22 extending axially from the core 14 as extensions of the coil portions 20. Each end portion 22 includes connecting means in the form of solder clamps 24 in order to electrically couple transposition groups of the stator winding 18 in a plurality of predetermined phase groups.

The stator winding 18 also includes insulating means 26 for insulating the connecting means 24 of each predetermined phase group from others of the plurality of phase groups. As is conventional, the coil portions 20 that are disposed within the slots 16 are built up from a plurality of conductors 28 which are separated one from another in the slot 16 by means of an insulation spacer 30, and are wedged in the slot 16 by wedges 32. The coil portions 20 also have a basic insulation layer 34 surrounding the elementary conductors 28. Rectangular tubes 36 are provided inside each coil portion 20 for circulation of a cooling medium (e.g., hydrogen). Alternatively, cooling media may comprise liquids which can be circulated through the tubes 36 by means of a header in the manner shown in the Vakser et al. '254 patent discussed above. It should be clear, therefore, that this invention may be incorporated within any turbine-generator 10 which utilizes conductor cooling of any known means.

The end portions 22 of the stator winding 18 are divided along the stator circumference into several alternating groups belonging to different winding phases. However, for the sake of simplicity, FIG. 1 illustrates only one portion of one such phase group. When current is caused to flow through each of the coil portions 20 in the stator winding 18 of an operating turbine-generator 10, a relatively high potential difference exists between the closest points of the end portions 22 in adjacent phase groups. These potential differences can be especially high when the turbine-generator 10 undergoes high voltage tests. Accordingly, spacing of the end portions 22 becomes critical in order to avoid conditions of flashover.

While conventional insulating means 26 have been able in the past to generally avoid such conditions of flashover, the inventor herein has found that the irregular surfaces of the connecting means 24 in a phase group can lead to a non-uniform electric field between the connecting means 24 of an adjacent phase group. That is, the potential difference which exists between the closest points of the end portions 22 in adjacent phase groups cannot be eliminated. It can only be mollified by the use of insulating means 26 and a sufficient spacing of the phase groups. However, the non-uniform electric fields set up by the potential difference and the irregular surfaces of the connecting means 24 can lead to further occurrences of flashover if an attempt is made to reduce the spacing between the connecting means 24 of adjacent phase groups.

Figure 2:
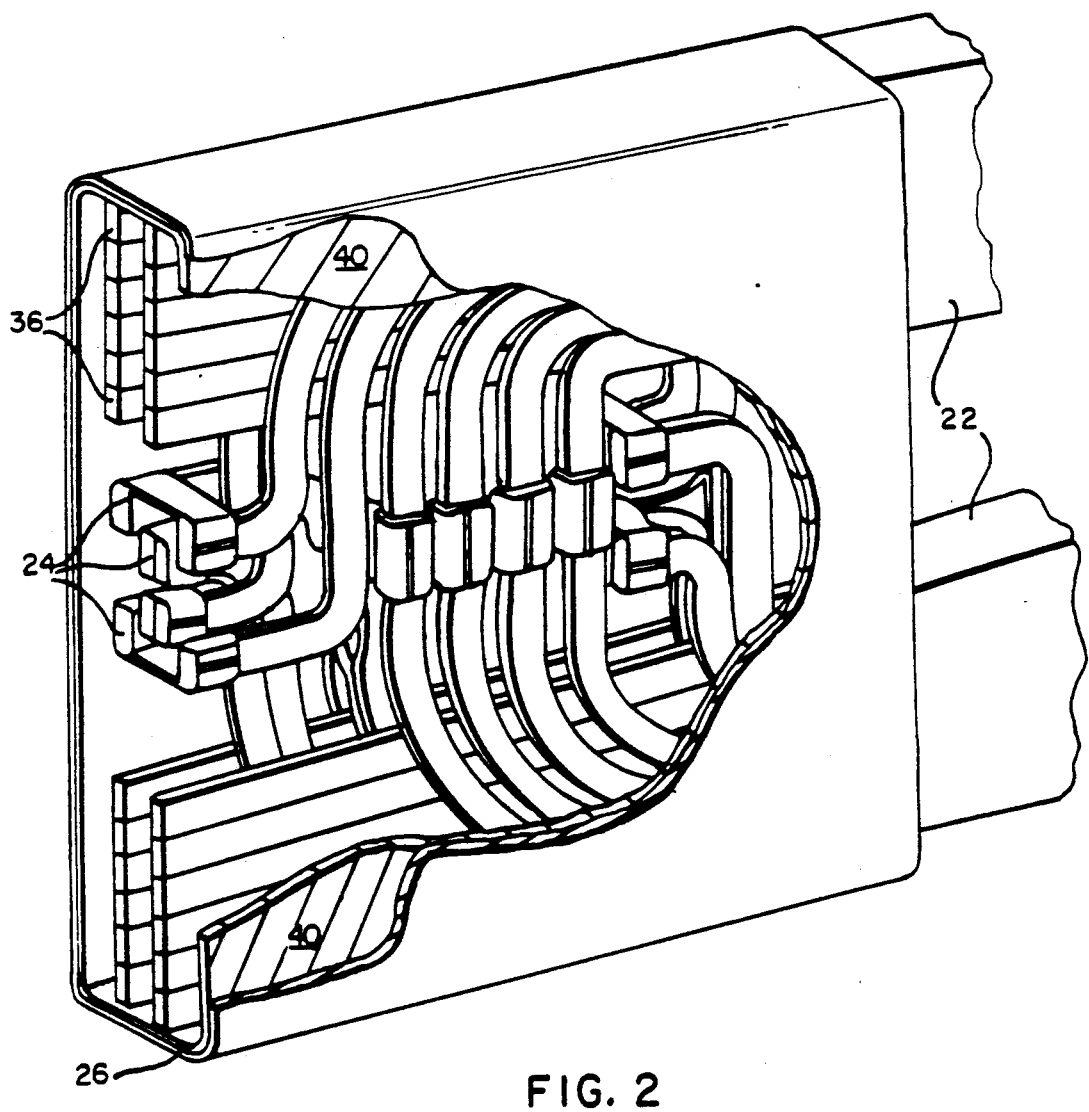
FIG. 2 illustrates one method and apparatus to improve flashover voltage levels in the turbine-generator shown in FIG. 1, by adding a semiconducting layer on inside surfaces of the insulating means surrounding stator coil connections of such turbine-generators.

In accordance with an important aspect of this invention, therefore and referring now to FIG. 2, a semiconducting layer 40 is applied between the connecting means 24 for each of the end portions 22, and the insulating means 26 surrounding such connecting means 24. The semiconducting layer 40 is connected electrically at least at one location (e.g., at single solder clamps) within the connecting means 24. Moreover, resistance of the semiconducting layer is selected to be high enough for ensuring that its shunting of several group connections is not significant, but low enough compared to a capacitive impedance between two connections such that the electric field existing therebetween is more uniform. In essence, therefore, the two semiconducting layers 40 of end portions 22 in adjacent phase groups act as electrodes for the electric field. The uniform electric field that is, thus promoted by using semiconducting layers 40 between the connecting means 24 and its insulating means 26 permits smaller spaces between respective connecting means 24 of adjacent phase groups, and also prevents electric discharge between the connecting means 24 and its insulating means 26 because any gaps existing therebetween are shorted.

Such a semiconducting layer 40 can be incorporated within the turbine-generator 10 initially by wrapping the connecting means 24 with a conductive tape before the connecting means 24 is in turn wrapped by an insulating tape which comprises the insulating means 26. Alternatively, where the insulating means 26 comprises an insulating box (e.g., dielectric boxes as shown in the Vakser et al. '254 patent), the semiconducting layers 40 suitably comprise a conductive weave on the inside of the insulating boxes, or a coating of those inside portions with a conductive paint.

For a large (e.g., 20 kV) turbine-generator, the typical value of the capacitance between two adjacent coil connections therein may approximate 6.5 picofarads. This capacitance, in turn, corresponds to an impedance of about 400 megohms. With these levels of capacitance and impedance in mind, therefore, it has been found that a suitable range of surface resistances for a semiconducting layer 40 in accordance with the invention are from about 0.1 megohm to about 10 megohms.

The present invention can be applied effectively to most large (i.e., 13.8 kV to 26 kV) turbine-generators, and enables the spacing between the insulated connections in such turbine-generators to be reduced under their typical two-inch limits which require about 62 kV-rms for flashover. Moreover, such semiconducting layers 40 promote uniformity of electric fields between end portion connections of adjacent phase groups, and thereby improve flashover voltage levels in turbine-generators while, at the same time, reducing the space between their end portion connections.

Obviously, many modifications and variations according to the present invention are possible in light of the above teachings. It is to be understood, therefore, that within the scope of the appended claims, this invention may be practiced otherwise than as specifically described herein.

What I claim as my invention is:

1. A dynamoelectric machine, comprising:
   a stator with a core, a plurality of coil-receiving slots in said core an da stator winding wound about said core, wherein said stator winding includes coil portions which are disposed within said slots and end portions extending axially from said core as extensions of said coil portions, each said end portion having a plurality of connecting means for electrically coupling transposition groups of said stator winding in a plurality of predetermined phase groups;
   means for insulating said plurality of connecting means of each said predetermined phase group from others of said plurality of predetermined phase groups; and
   a semiconducting layer positioned between said plurality of connecting means and said insulating means and electrically coupled to at least one of said connecting means for providing a substantially uniform electric field between said connecting means of adjacent phase groups.

2. The dynamoelectric machine according to clam 1, wherein said insulating means comprises an insulating tape.

3. The dynamoelectric machine according to claim 1, wherein said insulating means comprises an insulating box surrounding said connecting means of each said predetermined phase group.

4. The dynamoelectric machine according to claim 3, wherein said insulating box comprises a dielectric box.

5. The dynamoelectric machine according to claim 1, wherein said semiconducting layer comprises a material having a surface resistance of from about 0.1 to about 10 megohms.

6. The dynamoelectric machine according to claim 1, wherein two of said semiconducting layers of said connecting means in adjacent phase groups act as electrodes for the electric field.

7. The dynamoelectric machine according to claim 1, wherein spacing between said connecting means is less than approximately two inches.

8. In a stator winding which includes a plurality of end connections, the improvement comprising in combination therewith;
   insulation means substantially covering said plurality of end connections; and
   a semiconducting layer positioned between said plurality of end connections and said insulating means, said semiconducting layer having a resistance within a predetermined range for substantially avoiding shunting of several group connections, while enhancing the uniformity of an electric field between each predetermined phase group from other adjacent phase groups when a current flows through said stator winding.

9. The improvement according to claim 8, wherein said semiconducting layer is electrically coupled to at least one of the end connections.

* * * * *